Figure 1:
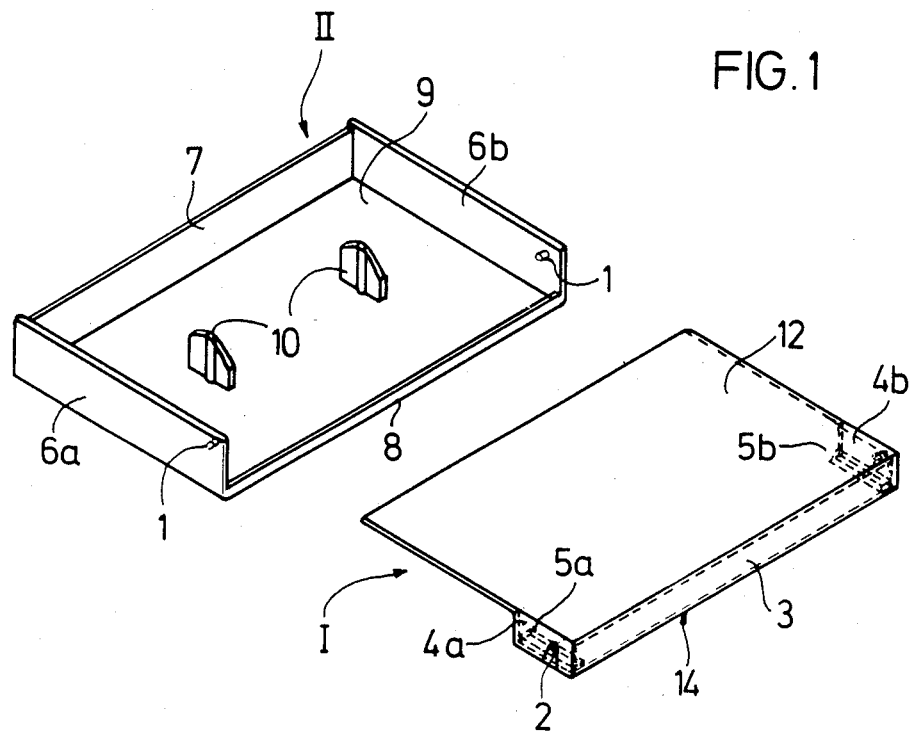

United States Patent [19]

Schuett

[11] Patent Number: 4,673,083
[45] Date of Patent: Jun. 16, 1987

[54] STORAGE CONTAINER FOR A TAPE CASSETTE

[75] Inventor: Walter Schuett, Kehl, Fed. Rep. of Germany

[73] Assignee: BASF Aktiengesellschaft, Ludwigshafen, Fed. Rep. of Germany

[21] Appl. No.: 782,928

[22] Filed: Oct. 2, 1985

[30] Foreign Application Priority Data

Oct. 3, 1984 [DE] Fed. Rep. of Germany ....... 8429000

[51] Int. Cl.$^4$ .......................................... B65D 85/672
[52] U.S. Cl. .................. 206/387; 206/45.23; 220/337
[58] Field of Search ............. 206/387, 444, 45.15, 206/45.23, 45.31; 220/335, 336, 337

[56] References Cited

U.S. PATENT DOCUMENTS

| 2,375,645 | 5/1945 | Gordon | 220/337 |
| 3,531,823 | 10/1970 | Cornelius | 220/337 |
| 3,620,361 | 11/1971 | Fugiwara | 206/387 |
| 4,356,918 | 11/1982 | Kahle et al. | 206/387 |
| 4,378,066 | 3/1983 | Sato et al. | 206/387 |
| 4,478,335 | 10/1984 | Long et al. | 206/45.23 |
| 4,527,690 | 7/1985 | Schmidts et al. | 206/387 |

FOREIGN PATENT DOCUMENTS

| 854022 | 10/1970 | Canada | 206/387 |
| 3149559 | 12/1983 | Fed. Rep. of Germany | |
| 2088337 | 6/1982 | United Kingdom | 206/45.34 |
| 2125373 | 3/1984 | United Kingdom | 206/425 |

Primary Examiner—William Price
Assistant Examiner—Brenda J. Ehrhardt
Attorney, Agent, or Firm—Keil & Weinkauf

[57] ABSTRACT

A storage container for a cassette has a base part (II) pivotally connected to a lid part (I). The lid part (I) is provided with cassette retaining means (3, 4a, 4b, 5a, 5b), e.g. a pocket, wich cooperates with a back wall (8) of base part (II) to limit pivotal opening of the lid part (I) relative to the base part (II).

1 Claim, 6 Drawing Figures ns container for a compact cassette having a base part and a lid part pivotally connected thereto and provided with a pocket for holding a cassette. A trapezoidal cutout is provided in a bottom wall of the base part which cutout is filled by a trapezoidal front wall of the pocket when the container is closed. The hinge points are chosen so that the front edge of the bottom of the pocket can come into contact with the residual side walls of the bottom wall and thus restrict the opening rotation of the lid part relative to the base part to 180°. After repeated testing of the angular limits in a manner or attempts at rotation beyond the limits, the points of contact become worn out, so that reliable restriction of rotation can no longer be ensured and the cassette falls to the floor.

STORAGE CONTAINER FOR A TAPE CASSETTE

This invention relates to a storage container for a tape cassette, comprising a base part having side walls, a front wall and a back wall and a lid part pivotally connected to the base part and having a lid wall and a back wall defining in part cassette retaining means for holding the cassette.

In U.S. Pat. No. 3,620,361, there is disclosed a container for a magnetic tape cassette having a base part and a lid part pivotally connected together and each provided with a narrow back wall, which walls, when the container is closed, complement one another and are together as high as the side walls of the closed container. However, no provision is made for cassette retaining means, e.g. a pocket, to hold the tape cassette. Furthermore the positions of the usual lateral pivot joints pivotally connecting the base part and lid part are chosen so that contact between the outer lid wall and the back wall of the base part can occur only at an angle greater than 210°, so that the cassette is not effectively prevented from falling out of the container.

In DE-A-3,149,559 there is disclosed a conventional storage container for a compact cassette having a base part and a lid part pivotally connected thereto and provided with a pocket for holding a cassette. A trapezoidal cutout is provided in a bottom wall of the base part which cutout is filled by a trapezoidal front wall of the pocket when the container is closed. The hinge points are chosen so that the front edge of the bottom of the pocket can come into contact with the residual side walls of the bottom wall and thus restrict the opening rotation of the lid part relative to the base part to 180°. After repeated testing of the angular limits in a manner or attempts at rotation beyond the limits, the points of contact become worn out, so that reliable restriction of rotation can no longer be ensured and the cassette falls to the floor.

It is an aim of the present invention to provide a storage container for a cassette having means for restricting the angle of opening of the lid part relative to the base part which are suitable and effective for fairly heavy cassettes, and which function reliably even when the container parts are subjected to frequent pivoting opening and closing operations.

According to the invention there is provided a storage container for a tape cassette comprising a base part having side walls, a front wall and a back wall and a lid part pivotally connected to the base part and having a lid wall and a back wall defining in part cassette retaining means for holding the cassette, the back walls of the base part and of the lid part complementing one another and together being as high as the side walls of the base part when the container is closed, the cassette retaining means, when the container has been opened coming into contact with the back wall of the base part for limiting the angle of pivotal opening of the lid part relative to the base part.

A cassette container which can be produced economically and used without problems over a long period and which has a novel three-dimensional shape is thus obtained.

Conveniently the cassette retaining means comprises a pocket provided on the lid part and having a bottom wall, formed by the back wall of the lid part, lateral walls and retaining strips provided on the lateral walls. This saves material, and is therefore cheaper, than a fully closed pocket.

In a particularly advantageous embodiment, two or more locking cams are provided on the back wall of the base part and on the back wall of the lid part, these cams coming into contact with one another only when the container is closed, with the result that the base part and the lid part are locked together, and it is possible to avoid accidental opening and prevent the cassette from falling out.

Figure 3:
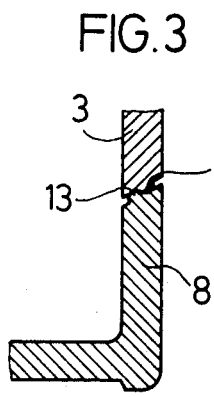
Figure 2:
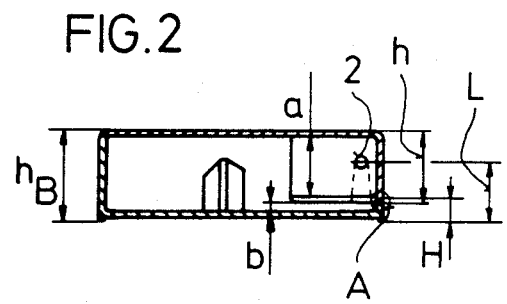
Figure 4:
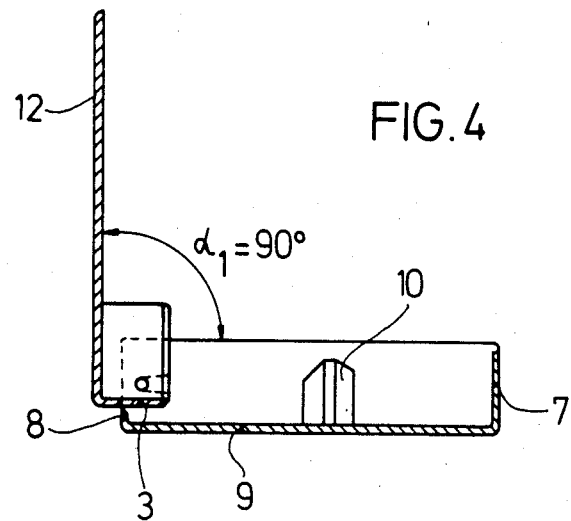
Figure 5:
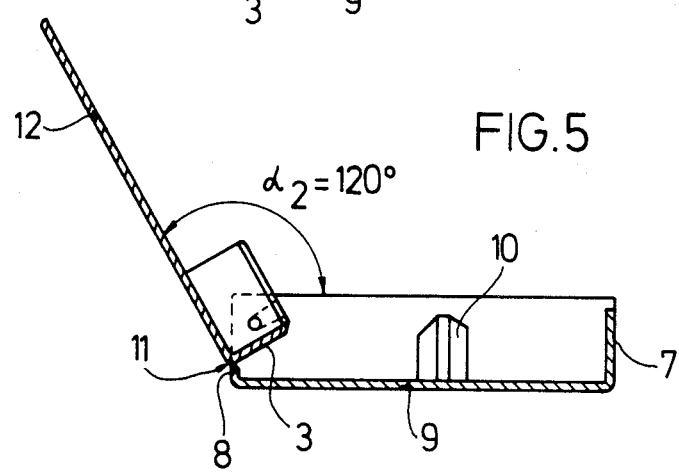
Figure 6:
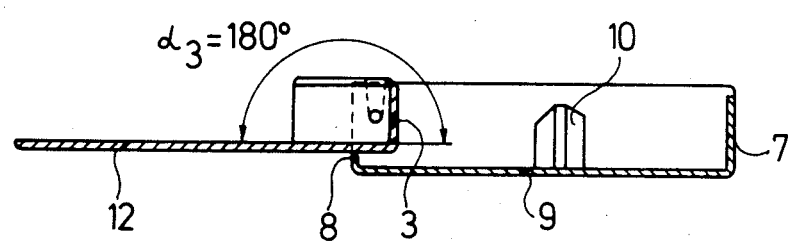

Embodiments of the invention will now be described, by way of example, with reference to the accompanying drawings, in which:

FIG. 1 is a perspective view of a base part and a lid part of a storage container according to the invention, the two parts being shown separated, FIG. 2 is a cross-sectional view through the middle of the container shown in FIG. 1 when the lid part is closed on the base part, FIG. 3 shows, on an enlarged scale, a detail A of FIG. 2 relating to a locking means for releasably locking the lid and base parts together, and FIGS. 4 to 6 show various embodiments of storage containers according to the invention having different limiting angles.

FIGS. 1 to 3 show a rectangular container for a tape cassette which is molded from thermoplastics and which comprises a lid part I pivotally or hingedly connected to an open base part II by means of hinge pegs 1 and hinge holes 2. A compact cassette is stored in the container by inserting it into a pocket of the lid part I with the head side facing forward. When the lid part I is closed by pivoting it onto the base part II, the cassette is protected from dust and is suitable for storage in archives. As shown, the cassette-receiving pocket consists of a back wall 3 (forming the bottom of the pocket), lateral walls 4a and 4b and, attached to these, retaining strips 5a and 5b, respectively.

The base part II carries the hinge pegs 1 on the inside of spaced apart walls 6a and 6b, which are connected on one side of a front wall 7 and on the other side by a low back wall 8 having a height H. Hub-holding elements 10 are provided on a bottom wall 9 of the base part II.

The height h of the lateral walls 4a and 4b of the pocket is such that the internal dimension a corresponds to at least the thickness of a cassette to be retained plus the thickness of any cassette insert.

The total height of back wall 8 of the base part and the back wall 3 of the lid part, H+h, thus corresponds to the container height $h_B$. Hence, the pocket containing the cassette is a distance b away from the bottom wall 9 of the container, this distance b roughly corresponding to the height of the back wall 8 of the base part II.

By employing these dimensions, it is possible to dispense with the usual recess in the bottom wall 9 of a conventional storage container and hence also to dispense with the front wall of the pocket on lid part I of the container. The larger outer surface thus obtained for the bottom wall 9 allows more extensive or more impressive surface designs.

The height and form of the back wall of the closed container are defined by the dimensional relationship $H+h=h_B$ (see above), and flush edges without an intervening gap, achieved by means of, for example, a chamfer, make the container dust-tight. Furthermore, the limiting angle α for the pivoting opening movement of the lid part I relative to the base part II can be determined by means of the height L of the pivot joint and/or the height H of the back wall 8. FIGS. 4 to 6 show positions at the limiting angles $\alpha_1 = 90°$, $\alpha_2 = 120°$ and $\alpha_3 = 180°$, which are achieved simply by varying the joint axis; these should of course be considered as illustrative examples. Other limiting angles are readily obtainable theoretically and in practice.

In the 90° container (FIG. 4), the back wall 3 of the lid part and the back wall 8 come into contact with one another or abut each other. In the 120° container (FIG. 5), the front edge 11 of the bottom of the pocket (i.e. where the back wall 3 meets the lid wall 12) comes into contact with the back wall 8. In the container shown in FIG. 6, rotation is restricted by virtue of the fact that the outer surface of the lid wall 12 comes to rest against the back wall 8.

For locking lid part I and base part II in the closed position to prevent accidental opening, conventional locking elements can be used, generally on the front edge or the lateral edges of lid wall 12 and on corresponding walls of the base part. Alternatively or additionally two or more locking cams 13 (see FIG. 3) may be provided on the upper edge of the back wall 8 of the base part II and on the lower edge 14 of the back wall 3 of the lid part I. As a result of the locking motion, the locking cams interlock with one another and thus form a positive connection which can be opened. The dimensions and number of cams 13 depend on the retaining force required (in general about 100 pond); in this respect, the container material used is of particular importance. Suitable container materials are any plastics which can be injection molded, in particular amorphous thermoplastics, e.g. polystyrene, ABS, polycarbonates, styrene/butadiene copolymers and styrene/acrylonitrile copolymers.

I claim:

1. A storage container for a tape cassette, comprising:

a base part having side walls, a front wall and a back wall, a lid part having a lid wall, side walls and a back wall defining in part cassette retaining means for holding the cassette, and cooperating hinge means on the side walls of the base part and of the lid part, respectively, for pivotally connecting said lid part to said base part, said hinge means being located on said side walls at a predetermined distance from said base wall, the back wall of said base part having a height substantially smaller than the height of the other walls of said base part, and said back wall of the lid part having a height complementing the height of the back wall of the base part in the closed position of the container, and said back walls together being as high as the side walls of the base part, said predetermined distance of the hinge means from said base wall being chosen so that in the opened position of the container the back walls of the base part and the lid part come in contact with one another at an opening angle which is defined by said predetermined distance and which is in the range of 90° to 180°, and the back walls of the base part and the lid part being formed with at least two locking cams which come into contact with one another only when the container is closed.

* * * * *